Patented July 2, 1929.

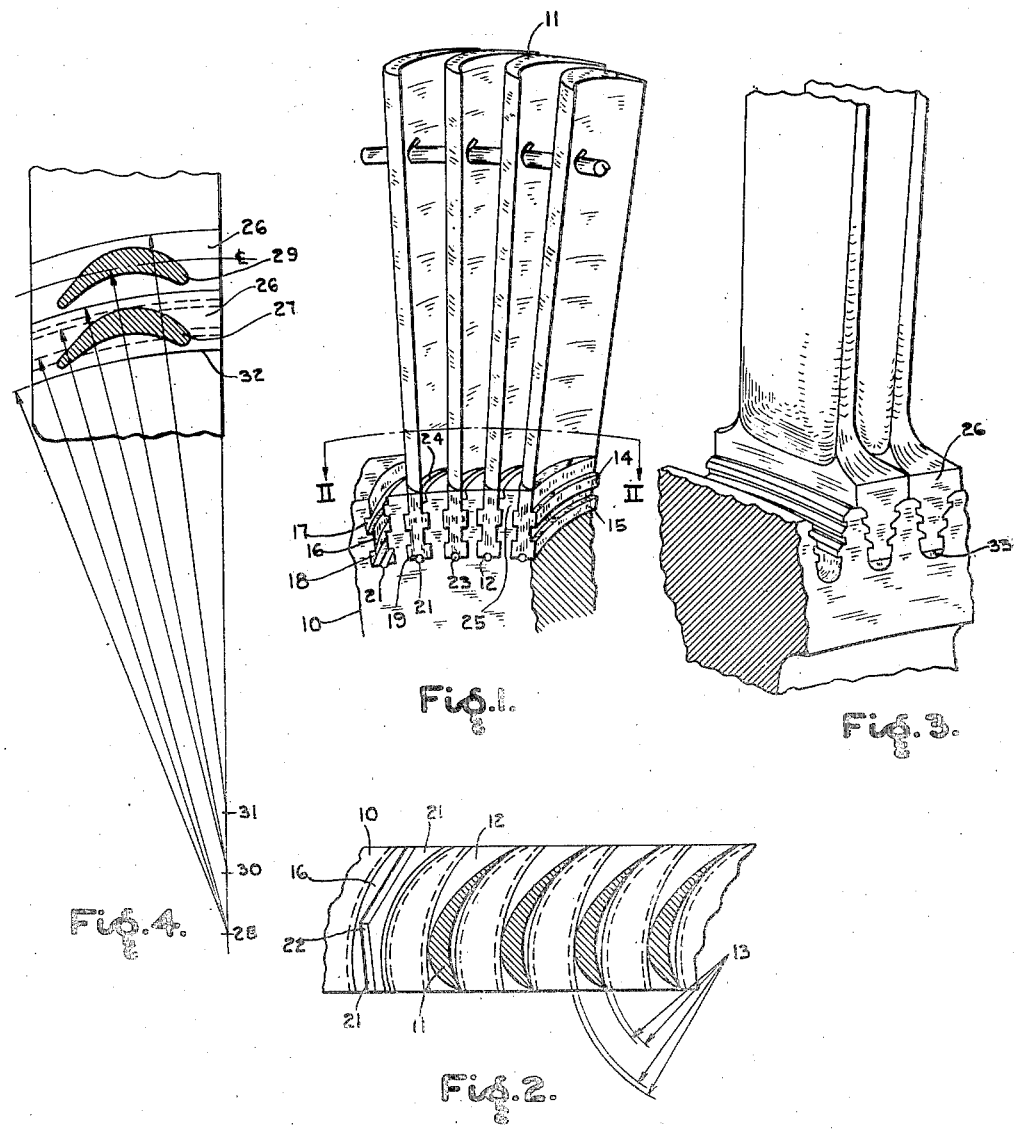

1,719,415

UNITED STATES PATENT OFFICE.

GOLDIE BACK, OF PHILADELPHIA, PENNSYLVANIA, ASSIGNOR TO WESTINGHOUSE ELECTRIC & MANUFACTURING COMPANY, A CORPORATION OF PENNSYLVANIA.

TURBINE-BLADE ATTACHMENT.

Application filed September 14, 1927. Serial No. 219,485.

This invention relates to a turbine blade attachment, more particularly to an attachment for securing turbine blades to a rotor disk, and it has for its object to provide an improved form of attachment.

More specifically, it is an object of my invention to provide an attachment of higher mechanical efficiency than heretofore available, that is, an attachment which will require a minimum amount of material to secure the blade to the rotor with means of greater strength than heretofore available, while, at the same time, securing the minimum spacing of adjacent blades, both circumferentially and axially, to satisfy the limitations imposed by the conditions of fluid flow in the steam path.

It has heretofore been proposed to attach turbine blades to a turbine rotor disk by cutting axially extending grooves having undercut recesses in the disk, and providing the blades with root portions fitting grooves, the root portions being inserted therein by sliding the blades axially.

In accordance with the present invention, instead of being formed in an axial direction, the root portion and groove are curved, being concave and convex on the respective concave and convex sides of the blade. They are preferably formed along arcs or arcuate surfaces whose centers lie in the vicinity of the approximate center line of curvature of the blade. The root portion thus conforms more nearly to the section of the blade.

Two constructions embodying my invention are illustrated in the accompanying drawing in which:

Fig. 1 is a perspective view, with parts broken away and in section, of a turbine disk having blades attached thereto in accordance with my invention;

Fig. 2 is a plan view of the rotor and the blades attached thereto;

Fig. 3 is a perspective view of a second embodiment of my invention; and,

Fig. 4 is a diagrammatic view, in plan, of the second embodiment, showing the centers of curvature.

The turbine rotor is illustrated as the disk 10, the invention being particularly applicable to a disk rotor or a rotor having a peripheral portion in the form of a disk, though not limited thereto. The disk 10 carries a row of curved blades 11.

Each blade is provided with an enlarged root portion 12. The contour of the root portion in plan, as seen in Fig. 2, is arcuate and conforms approximately to the curved section of the blade. Both sides of the root portion are formed along arcs or arcuate surfaces whose centers lie as near as practical to the approximate center line of curvature of the blade, as indicated at 13. This center line extends radially, or substantially so, of the rotor.

While I illustrate and describe the sides of the root portion and groove as arcuate about a common center, they may have different centers, or they may be of any curved form adapted to permit the proper assembly of the curved blades. Broadly, the root portion is concave on the concave side of the blade and convex on the convex side of the blade.

Each root portion is provided with interlocking projections 14 and 15, and is secured in a groove 16, conforming to the root portion and formed in the outer cylindrical or peripheral surface of the disk 10. The groove 16, which is provided with undercut recesses 17 and 18 to receive the interlocking projections 14 and 15, may be cut by a milling cutter mounted on a radius arm swinging about the center 13. The blades are mounted on the disk by inserting the root portion into one end of the groove, at one side of the disk, and sliding it into the groove in a circular direction about the center 13. Hence, it will be seen that the sides of the grooves and of the root portions are surfaces of revolution and that the surfaces of the root portions are conjugate to surfaces of the grooves.

As illustrated in Fig. 2, the root portion is preferably enlarged with respect to the thickness of the blade section. The cross-section of the blade portion is governed by the conditions of steam flow, and the root portion, while conforming approximately to the blade section, is designed to permit lateral insertion in the groove. Thus by enlarging the root portion, the centrifugal stresses from each part of the blade are transmitted directly to a part of the root portion.

Registering grooves 19 and 21 are formed in the root portion and the bottom of the groove, extending from each end to the intersecting point 22. In the space so provided, caulking strips 23 are inserted and caulked to hold the blade rigidly in place. A caulking strip 24 may also be inserted in a recess on one side of the root portion at the outer surface of the disk, to hold the root portion laterally. It will be apparent that any other equivalent caulking means may be used.

In Figs. 3 and 4, I show a form of my invention in which an enlarged portion 26 is provided between the root portion and the blade proper. This enlarged portion serves two purposes; first, it provides means for conveying and distributing the stresses from the blade to the root portion, and second, it abuts the enlarged portions of the adjacent blades, thereby bracing the blades against each other to provide a rigid unitary structure.

In this embodiment, as before, the sides of the root portion are formed along arcuate surfaces having a common center, the center for the blade 27 being indicated at 28, the center for the blade 29 at 30, and the center for the next blade (not shown) at 31. The concave side of the enlarged portion 26 is formed along an arcuate surface whose center is preferably the center for the concave side of the root portion, or, as in this case, a center for both sides; taking the blade 27, this is the center 28. The convex side, however, must abut the concave side of the next blade, 29, and hence it is formed along the arcuate surface whose center is the center 30, which is spaced from the center 28 a distance equal to the pitch of the blades at the enlarged portions, that is, the distance from one point of one blade to the same point on the next blade. When thus formed, it will be apparent, each blade may be inserted with the adjacent blade on the concave side thereof in place, since the concave side of the enlarged portion may slide along the convex side of the adjacent blade without interfering therewith.

This form produces an enlarged portion which is slightly narrower at the left hand side, as seen in Fig. 4, and whose maximum width is at the line of centers at the right hand end. Hence, a blade may be inserted from the right hand side with both adjacent blades in place. Caulking material may be inserted between the bottom of the groove and the root portion as indicated at 33, or the blades may be held in place in any suitable manner.

It will be noted from the drawing that I have provided a root portion for substantially the full extent of the blade section, circumferentially of the rotor. The curvature of the root portion and groove gives added strength to resist bending stresses, caused by the force of the motive fluid acting on the blade. By making the root portion of a contour conforming more nearly to the section of the blade, a minimum of material is required to support the blade, it thus being possible to space the blades as closely as necessary to obtain the most efficient extraction of energy from the motive fluid acting therein. At the same time, the blades may overlap in a circumferential direction. This form of root also enables a more even distribution of blade mass over the root.

By forming the grooves transversely of the disk, a minimum of material is also required in the disk to hold the root portions. The centrifugal force tending to pull each blade out of the groove is great, and tends to spread the parts 25 of the disk on opposite sides of the root. This action of one blade on a part 25, however, is counterbalanced by the same action of the blade on the opposite side thereof. Hence, it is not necessary to provide additional material on opposite sides of the grooves to resist such lateral stress.

From the foregoing, it will be apparent that my improved blade fastening provides for increased strength and, therefore, safely permits of higher blade speeds or heights or both.

While I have shown my invention in two forms, it will be obvious to those skilled in the art that it is not so limited, but is susceptible of varous other changes and modifications without departing from the spirit thereof, and I desire, therefore, that only such limitations shall be placed thereupon as are imposed by the prior art or as are specifically set forth in the appended claims.

What I claim is:—

1. A turbine blade provided with an enlarged root portion having concave and convex surfaces and means extending laterally from the concave and convex surfaces of the root portion for anchoring the blade to a rotor.

2. A turbine blade having a blade portion and an enlarged root portion curved in the same general direction as the blade portion and one or more projections on the root portion and curved similarly thereto for anchoring the blade to a rotor, said one or more projections extending laterally of the root portion.

3. In a turbine, the combination of a rotor having blade-holding grooves whose sides are surfaces of revolution about axes angularly disposed relative to the axis of the rotor, blades having root portions whose sides are surfaces of revolution and conjugate to the sides of said grooves, and interlocking means cooperating between the sides of the root portions and the side walls of the grooves for securing the root portions in the grooves.

4. A blade-holding rotor having grooves in the outer periphery thereof, the sides of each groove being formed along arcs whose centers lie on one side of the groove and the bottom of the groove joining the sides at the margins thereof toward the axis of the rotor.

5. In a fluid motor, a rotor having a row of grooves formed therein, a row of curved blades having root portions fitted in said grooves and interlocking with the side walls thereof, the sides of each groove and root portion being formed along arcs whose centers lie on that side of the groove on which the approximate center line of curvature of the blade lies.

6. A turbine rotor comprising a disk and curved blades mounted thereon, said blades having root portions of curved contour conforming approximately to the curvature of the blade, said disk having curved grooves across the periphery thereof fitting said root portions, and interlocking means securing the root portions in the grooves.

7. A turbine rotor comprising a disk and a row of curved blades mounted thereon, said blades having root portions of arcuate contour conforming approximately to the curvature of the blades and each said root portion having an interlocking projection on an arcuate side, said disk having arcuate grooves across the periphery thereof fitting said root portions and having undercut recesses fitting said interlocking projections on the root portions.

8. A blade-holding rotor having grooves in the outer periphery thereof, the sides of each groove being formed along arcs whose centers lie on a straight line extending substantially radially of the rotor and the bottom of the groove joining the sides at the margins thereof toward the axis of the rotor.

9. In a fluid motor, a rotor having a row of grooves formed therein, a row of curved blades having root portions fitted in said grooves, the side walls of each groove and the sides of the root portion therein being formed in interlocking relation to hold the blade against movement radially of the rotor and being formed along arcs whose centers lie in the vicinity of the approximate center line of curvature of said blade.

10. In a fluid motor, a rotor having a row of grooves formed therein, and a row of curved blades having root portions mounted in said grooves and interlocking therewith, the side walls of each groove and the sides of the root portion therein being formed in interlocking relation to hold the blade against movement radially of the rotor and being formed along arcs whose centers lie in the vicinity of the approximate center line of curvature of the blade, and said rotor being formed to permit the root portions to enter the grooves at one side of the row and to slide into the grooves about said center.

11. A blade-holding rotor having grooves in the outer periphery thereof, each groove having an undercut recess and the sides of each groove being formed along arcs whose centers lie on a straight line extending substantially radially of the rotor.

12. In a fluid motor, a rotor having a row of grooves formed therein, a row of curved blades having root portions fitted in said grooves, and interlocking means cooperating between the sides of the root portions and the side walls of the grooves for retaining the root portions in the grooves, the sides of each groove and root portion being formed along arcs whose centers lie in the vicinity of the approximate center line of curvature of said blade.

13. A turbine blade having a blade portion and a root portion, said blade portion and said root portion being concave on one side and convex on the opposite side, each of the concave and convex sides of the root portion being formed with a plurality of projections extending laterally therefrom for anchoring the same to a rotor.

14. In a fluid motor, a rotor and a row of curved blades mounted thereon, each blade having a root portion at one end thereof, said root portion being concave on the concave side of the blade and convex on the convex side of the blade, said root portion having projections extending laterally from the concave and convex sides thereof, the rotor being formed with grooves extending transversely of the row and into which the root portions are inserted, and the side walls of the grooves being formed with undercut recesses to receive the projections on the root portions.

15. In a turbine, a rotor having an annular row of curved blade-holding grooves, said grooves extending transversely of the row, and blades having curved root portions inserted in the grooves, said root portions and the side walls of the grooves being formed with interlocking projections which permit insertion of the root portions in the grooves longitudinally of the latter and which hold the blades against radial movement.

16. In a fluid motor, a rotor having a row of blade-holding grooves in its outer periphery extending transversely of the row, each groove being formed by a concave side wall, a convex side wall and a bottom wall joining the side walls at the margins thereof toward the axis of the rotor, and blades having root portions fitting in said grooves and interlocking with the side walls thereof.

In testimony whereof, I have hereunto subscribed my name this 25th day of August, 1927.

GOLDIE BACK.